(12) United States Patent
Frank (10) Patent No.: US 7,756,893 B2
(45) Date of Patent: Jul. 13, 2010

(54) INDEPENDENT COMPUTATION ENVIRONMENT AND DATA PROTECTION

(75) Inventor: Alexander Frank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 189 days.

(21) Appl. No.: 11/424,487

(22) Filed: Jun. 15, 2006

(65) Prior Publication Data

US 2007/0106682 A1    May 10, 2007

Related U.S. Application Data

(63) Continuation-in-part of application No. 11/418,710, filed on May 5, 2006.

(60) Provisional application No. 60/735,528, filed on Nov. 9, 2005.

(51) Int. Cl.
*G06F 7/00* (2006.01)
*G06F 17/30* (2006.01)

(52) U.S. Cl. .................. 707/781; 707/705; 707/783

(58) Field of Classification Search .............. 726/1–36; 707/8, 101–102, 200–206, 2–10; 341/50–107; 703/527; 708/203; 711/141–146; 712/300; 715/716–726; 717/174–178; 718/106; 709/203–210, 709/223; 713/153–168, 201
See application file for complete search history.

(56) References Cited

U.S. PATENT DOCUMENTS

| | | | |
|---|---|---|---|
| 5,481,463 | A | 1/1996 | Constant et al. |
| 5,634,058 | A | 5/1997 | Allen et al. |
| 5,826,090 | A | 10/1998 | Mealey et al. |
| 6,243,692 | B1 | 6/2001 | Floyd et al. |
| 6,272,636 | B1 | 8/2001 | Neville |

(Continued)

FOREIGN PATENT DOCUMENTS

EP    1357454 A1    10/2003

(Continued)

OTHER PUBLICATIONS

Henderson, "Linux Loadable Kernel Module HOWTO", retrieved at <<http://www.ibiblio.org/pub/Linux/docs/HOWTO/other-formats/pdf/Module-HOWTO.pdf>>, Lauri Tischler, 1996, pp. 90.

(Continued)

*Primary Examiner*—Cam Y Truong
*Assistant Examiner*—Cecile Vo
(74) *Attorney, Agent, or Firm*—Lee & Hayes, PLLC (57) ABSTRACT

An independent computation environment (ICE) that is isolated from tampering is contained in at least one hardware component of a general purpose computing device (CD). The CD includes at least one processor and memory operable to store instructions, which when executed by the at least one processor direct the CD to execute a module being monitored by the ICE. The ICE is operable to access the memory independent of an operating system of the CD. A policy engine is maintained within the ICE to monitor metadata related to the module and manage the execution of the module in accordance with the contents of a memory addresses and/or data registers of the CD that are referenced by the metadata. The ICE is operable to activate an enforcement mechanism to control an operating state of the CD in response to the monitoring of the module.

17 Claims, 5 Drawing Sheets

U.S. PATENT DOCUMENTS

| | | | |
|---|---|---|---|
| 6,327,652 | B1 | 12/2001 | England et al. |
| 6,363,436 | B1 | 3/2002 | Hagy et al. |
| 6,449,110 | B1 * | 9/2002 | DeGroat et al. ............... 360/46 |
| 6,499,110 | B1 * | 12/2002 | Moses et al. .................... 726/1 |
| 6,810,438 | B1 | 10/2004 | Chrysanthakopoulos |
| 6,985,946 | B1 | 1/2006 | Vasandani et al. |
| 7,069,330 | B1 * | 6/2006 | McArdle et al. ............ 709/229 |
| 7,146,496 | B2 | 12/2006 | Circenis et al. |
| 7,171,686 | B1 | 1/2007 | Jansen et al. |
| 7,228,545 | B2 | 6/2007 | Circenis et al. |
| 7,281,008 | B1 | 10/2007 | Lawrence et al. |
| 7,334,124 | B2 * | 2/2008 | Pham et al. ................. 713/162 |
| 7,373,497 | B2 | 5/2008 | Circenis et al. |
| 7,392,541 | B2 * | 6/2008 | Largman et al. .............. 726/17 |
| 7,500,093 | B2 | 3/2009 | Makita |
| 7,571,143 | B2 | 8/2009 | Circenis et al. |
| 2001/0034762 | A1 | 10/2001 | Jacobs et al. |
| 2002/0042882 | A1 | 4/2002 | Dervan et al. |
| 2002/0147633 | A1 | 10/2002 | Rafizadeh |
| 2005/0055588 | A1 | 3/2005 | Nalawadi et al. |
| 2005/0144608 | A1 | 6/2005 | Oyama et al. |
| 2005/0160035 | A1 | 7/2005 | Umamyo |
| 2005/0160281 | A1 | 7/2005 | Thibadeau |
| 2005/0166208 | A1 | 7/2005 | Worley et al. |
| 2005/0172017 | A1 * | 8/2005 | Dawson ...................... 709/223 |
| 2005/0223243 | A1 | 10/2005 | Moore et al. |
| 2005/0240985 | A1 * | 10/2005 | Alkove et al. .................. 726/1 |
| 2005/0268058 | A1 | 12/2005 | Drasnin et al. |
| 2006/0015566 | A1 | 1/2006 | Sampson |
| 2006/0080648 | A1 | 4/2006 | Anwar et al. |
| 2006/0128305 | A1 | 6/2006 | Delalat |
| 2006/0174229 | A1 | 8/2006 | Muser |
| 2006/0224689 | A1 | 10/2006 | Leip et al. |
| 2007/0143159 | A1 | 6/2007 | Dillard et al. |
| 2007/0180450 | A1 * | 8/2007 | Croft et al. ..................... 718/1 |
| 2007/0232342 | A1 | 10/2007 | Larocca |
| 2007/0240160 | A1 * | 10/2007 | Paterson-Jones et al. .... 718/104 |
| 2007/0293169 | A1 | 12/2007 | Maggio |
| 2008/0104186 | A1 | 5/2008 | Wieneke et al. |
| 2008/0312948 | A1 | 12/2008 | Kalliola |
| 2008/0319841 | A1 | 12/2008 | Oliver et al. |
| 2009/0052648 | A1 | 2/2009 | Lankes |
| 2009/0103524 | A1 | 4/2009 | Mantripragada et al. |
| 2009/0222907 | A1 | 9/2009 | Guichard |

FOREIGN PATENT DOCUMENTS

| | | |
|---|---|---|
| WO | WO03077156 A1 | 9/2003 |
| WO | WO2004006059 A2 | 1/2004 |

OTHER PUBLICATIONS

Lerhaupt, et al., "Dynamic Kernel Module Support", retrieved at <<http://linux.dell.com/dkms/1q04-ler.pdf>>, Power Solutions, Mar. 2004, pp. 94-98.

"Managing and Developing Dynamically Loadable Kernel Modules", retrieved at <<http://docs.hp.com/en/dlkm-62001/dlkm-62001.pdf>>, Hewlett-Packard, Jun. 7, 2001, pp. 489-572.

Stavrou, et al., "A Pay-per-Use DoX Protection Mechanism For The Web", Columbia University, 2004, pp. 1-15.

Zhang, et al., "Achieving Deterministic, Hard Real-time Control On An IBM—Compatible PC: A General Configuration Guideline", Department of Mechanical Engineering, University of New Mexico, 2005, pp. 1-7.

* cited by examiner

INDEPENDENT COMPUTATION ENVIRONMENT AND DATA PROTECTION

CROSS REFERENCE TO RELATED APPLICATIONS

The present invention claims priority as a continuation-in-part to U.S. patent application Ser. No. 11/418,710, filed May 5, 2006, which claims priority to U.S. Provisional Patent Application Ser. No. 60/735,528, filed Nov. 9, 2005, the entire disclosures of which are hereby incorporated by reference in their entireties.

BACKGROUND

In traditional business models, consumers purchased both computing devices and software for execution on the computing devices. Therefore, traditional computing devices were configured for "open" and "general purpose" execution of software desired by the user and not limited, by itself, to execution of particular software. For example, under this traditional business model the consumer may purchase a desktop personal computer (PC) having an operating system that permits execution of a wide range of applications, such as games, word processors, spreadsheets, and so on that may be obtained from a wide range of venders. Therefore, a provider (e.g., manufacturer) of the desktop PC typically used a configuration that enabled the PC to execute as many of these different applications as possible, thereby increasing the functionality available to the consumer and consequently the desirability of the PC to the consumer.

Configuration as a "general purpose" computing device, however, typically limited the computing device to this traditional business model and thus limited sellers of the computing device from availing themselves of other business models. For example, a seller may wish to use a business model in which consumers "pay-as-they-go". Therefore, in this example, a seller of the computing device may subsidize the initial purchase price of the computing device in order to collect revenue from the user at a later time, such as in the sale of services and/or software to the consumer over a network. However, if the computing device is configured for general purpose execution of software, the consumer may choose to forgo use of the seller's services and instead use a competitor's services, thereby removing the incentive for the seller to subsidize the cost of the computing device.

SUMMARY

Techniques are described which provide an independent computation environment to protect data, which may be used to control functionality in an "open" and "general purpose" computing device. The independent computation environment is contained at least in part in a set of one or more hardware components. The independent computation environment is configured to host a policy engine that measures the health of other modules (e.g., applications) that are in memory, such as to determine that the other modules are functioning as intended. By executing the policy engine in an independent computation environment, a tamper-proof or tamper-resistant environment is provided in which the health of other modules may be periodically measured for compliance with a policy. This tamper-proof environment and the enforcement of policies may be used in a variety of ways, such as to support a wide range of business models, e.g., a subsidy business model. The independent computation environment may be configured in a variety of ways.

In an implementation, an independent computation environment is contained at least in part in one or more hardware components of a computing device. A policy engine is maintained within the independent computation environment that is executable to examine metadata related to another module and manage execution of the other module in relation to one or more memory addresses and/or data registers of the computing device that are referenced by the metadata.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional business models enabled a consumer to purchase a computing device (e.g., a desktop personal computer) that was configured to execute software that was also purchased by the consumer. Therefore, this traditional business model provided two streams of revenue, one to the manufacturer and seller of the computing device and another to a developer and seller of the software. Thus, traditional computing devices were configured for "open" and "general purpose" execution of software such that the consumer was not limited to execution of particular software beyond that which was specified by the software itself e.g., digital rights management techniques for software. By configuring a computing device for general purpose execution, however, the computing device may not be suitable for use in other business models, such as in models that subsidize all or a portion of a purchase price of the computing device in order to collect revenue later from use of the device.

Techniques are described, in which, an independent computation environment is created, which may be used to ensure execution of particular software. This particular software, for instance, may be configured to enforce policies related to desired operation of the computing device. A seller, for instance, may use a "pay-per-use" model in which the seller gains revenue through the sale of prepaid cards that enable use of the computing devices for a limited amount of time, for a predetermined number of times, to perform a predetermined number of functions, and so on. In another instance, a software provider provides subscription-based use of software and therefore subsidizes the cost of providing the computing device. In these instances, the policies may specify how functionality of the computing device is to be managed to ensure that the computing device is used in a manner to support this model. For example, the user may be limited to use of the computing device in conjunction with particular web services, access to which is gained by paying a fee. Therefore, the software provider may subsidize the cost of the computing device in order to obtain revenue from the user when accessing the services. A variety of other examples are also contemplated.

A variety of techniques may be used by the independent computation environment to manage functionality of the computing device. For example, software code (e.g., an application) being measured may include metadata that described the code itself, such as for modular authentication, e.g., through use of a signature, certificate, and so on. The metadata may also describe memory address of where information relating to the code is to be stored in the computing device, such as an actual physical memory address and/or virtual memory addresses. The policy engine, executed through the independent computation environment, may ensure that the code is executed as described by the metadata, e.g., within the specified memory addresses of the computing device. Further, the policy engine may block attempts by adversaries (e.g. other software, or peripheral devices) to access these memory addresses, thereby protecting the task (i.e., its code and state) from tampering by malicious parties. A variety of other examples are also contemplated, such as through specification by metadata of particular data registers, further discussion of which may be found in greater detail below.

In the following discussion, an exemplary environment and devices are first described that are operable to perform techniques to provide an independent execution environment. Exemplary procedures are then described that may be employed in the exemplary environment and/or implemented by the exemplary devices, as well as in other environments and/or devices.

EXEMPLARY ENVIRONMENT

Figure 1:
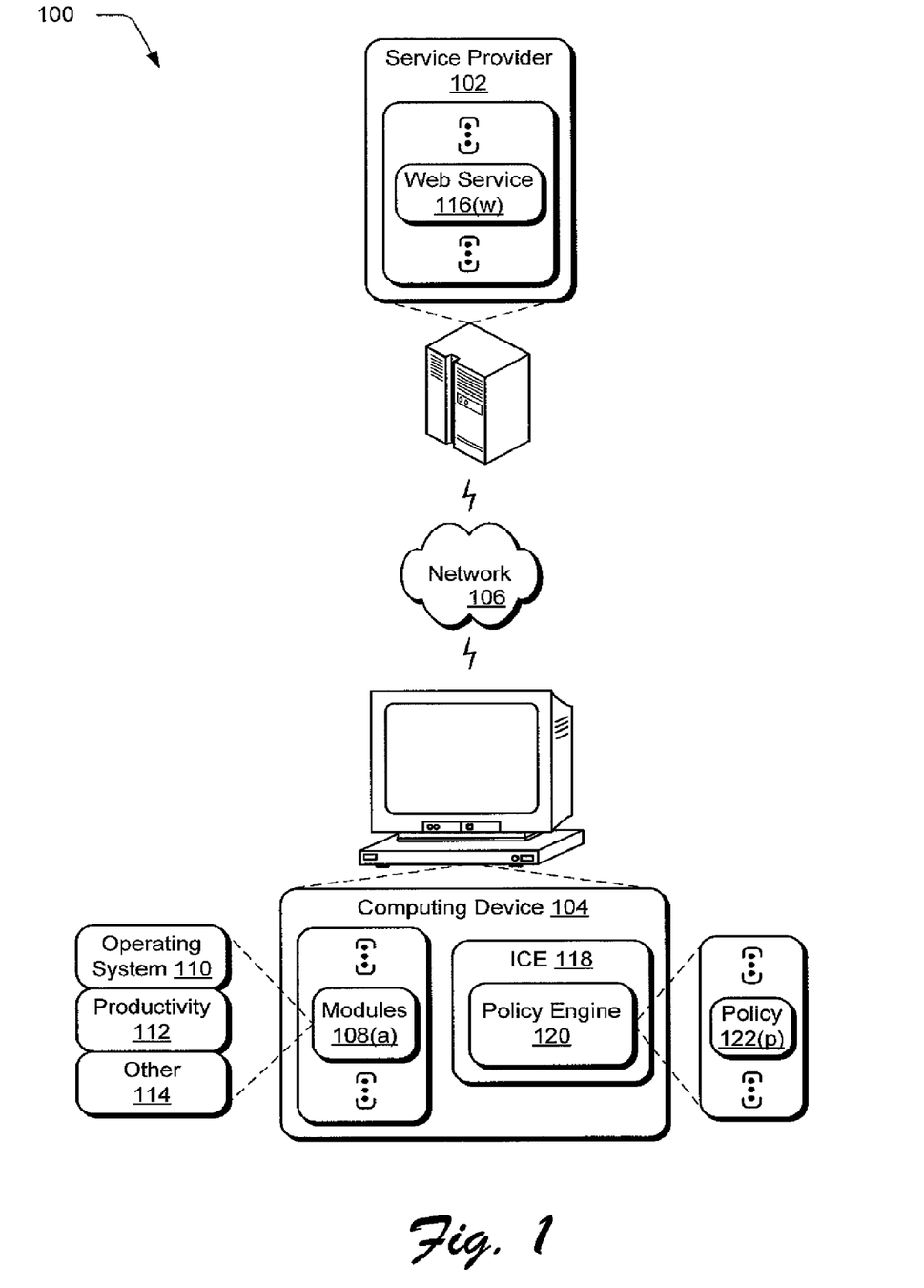
FIG. 1 is an illustration of an environment in an exemplary implementation that is operable to employ techniques to provide an independent computation environment.

FIG. 1 is an illustration of an environment 100 in an exemplary implementation that is operable to employ techniques that provide a secure execution environment. The illustrated environment 100 includes a data center 102 and a computing device 104 that are communicatively coupled, one to another, via a network 106. In the following discussion, the data center 102 may be representative of one or more entities, and therefore reference may be made to a single entity (e.g., the data center 102) or multiple entities (e.g., the data centers 102, the plurality of data centers 102, and so on).

The computing device 104 may be configured in a variety of ways. For example, the computing devices 104 may be configured as a desktop computer, a mobile station, an entertainment appliance, a set-top box communicatively coupled to a display device, a wireless phone, a game console, and so forth. Thus, the computing device 104 may range from full resource device with substantial memory and processor resources (e.g., personal computers, game consoles) to low-resource device with limited memory and/or processing resources (e.g., traditional set-top box, hand-held game console).

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The computing device 104 is illustrated as having one or more modules 108(a) (where "a" can be any integer from one to "A"). The modules 108(a) may be configured in a variety of ways to provide a variety of functionality. For example, one of the modules 108(a) may be configured as an operating system 110 that provides a basis for execution of other ones of the modules 108(a). The other modules 108(a), for instance, may be configured as productivity applications 112, such as word processors, spreadsheets, slideshow presentation applications, graphical design applications, and note-taking applications. The modules 108(a) may also be configured in a variety of other 114 ways, such as a game, configured for network access (e.g., a browser), and so on. For instance, the module 108(a), when executed, may interact with one or more web services over the network 106. Further, the modules 108(a) may be configured to add functionality to other modules, such as through configuration as a "plug in" module.

As previously described, under traditional business models, computing devices were typically configured for "general purpose" usage to enable a user to access a wide range of modules as desired. However, such "general purpose" configuration limited the computing device from taking advantage of other business models, in which, cost of the computing device was subsidized by another entity, such as a software provider, network access provider, web service provider, and so on. For instance, these other entities may collect revenue from use of the services and therefore subsidize the cost of the computing device to encourage users to use the services. In another example, a "pay-per-use" model may be used, in which, the initial cost of the computing device is subsidized and the user pays for use of the computing device in a variety of ways, such as a subscription fee, a fee paid for a set amount of time, a fee paid for use of a set amount of resources, and so on.

Therefore, the computing device 104 of FIG. 1 is configured to provide an environment, in which, execution of particular software may be secured to enforce use of the computing device 104 in a manner desired by a manufacturer/seller of the computing device 104. Various aspects of the technology described herein, for instance, are directed towards a technology by which any given piece of software code may be measured for verification (e.g., of its integrity and authenticity) in a regular, ongoing manner that effectively takes place in real-time. As used herein, the term "measure" and its variants (e.g., "measured," "measuring," "measurement" and so forth) with respect to software code generally refers to any abstraction for integrity and/or authentication checks, in which there are several ways to validate integrity and/or authentication processes. Some example ways to measure are described below, however this measurement abstraction is not limited to those examples, and includes future any techniques and/or mechanisms for evaluating software code and/or its execution.

As will be understood, multiple sets of the modules 108(a) may be measured, and some action, e.g., penalty, applied in the event that any set of code is not verified as "healthy", e.g., functions as intended by a provider of the computing device.

For example, as a penalty, the computing device 104 may be shut down when executing an "unhealthy" module, may reduce its performance in some way (at least in part) that makes normal usage impractical, may force an administrator to contact a software vendor or manufacturer for a fix/permission, the unhealthy module may be stalled, (e.g., by trapping—which may be implemented on x86 based computers using an 'int3' instruction) and so forth.

In general and as described above, replaceable or modifiable software, as is the situation with an open operating system, is generally not an acceptable mechanism for measuring the health of other software code. Instead, techniques are described, in which, a hardware-aided mechanism/solution (e.g., processor based) provides for an external root of trust that is independent of the operating system 110. As also described below, to measure the integrity of sets of code such as binary modules, the hardware mechanism may take actions to compensate for the lack of a real-time method, and also may provide data about the execution of each subject binary module to help reach a conclusion about its health.

In one example implementation, the hardware mechanism comprises an independent (sometimes alternatively referred to as isolated) computation environment (or ICE) 118, comprising any code, microcode, logic, device, part of another device, a virtual device, an ICE modeled as a device, integrated circuitry, hybrid of circuitry and software, a smartcard, any combination of the above, any means (independent of structure) that performs the functionality of an ICE described herein, and so forth, that is protected (e.g., in hardware) from tampering by other parties, including tampering via the operating system 110, bus masters, and so on.

The ICE 118 enables independent computation environment-hosted logic (e.g., hardwired logic, flashed code, hosted program code, microcode and/or essentially any computer-readable instructions) to interact with the operating system, e.g. to have the operating system suggest where the subject modules supposedly reside. Multiple independent computation environments are feasible, but one independent computation environment that monitors multiple memory regions for possibly many different characteristics may suffice.

The ICE 118, for instance, is illustrated as including a policy engine 120 which is representative of logic that applies one or more policies 122(p) (where "p" can be any integer from one to "P") which describe how functionality of the computing device 104 is to be managed. By verifying the policy engine 120 for execution on the computing device 104, for instance, the computing device 104 may be prevented from being "hacked" and used for other purposes that lie outside of the contemplated business model. Further, the policy engine 120, when executed within the ICE 118, may measure the "health" of the other modules 108(a) to ensure that these modules 108(a) function as described by the policy 122(p). Further discussion of policy enforcement may be found in relation to FIGS. 2-4.

It should be apparent that inclusion of the data center 102 in the environment is optional. For example, the ICE hosted policy engine 120 may support a variety of authorization techniques, such as certificate chains, support authorization queries issued/originated by the ICE-hosted policy engine itself, and so on. Further, the data center 102 server revocation queries or other policy updates and details.

Generally, any of the functions described herein can be implemented using software, firmware, hardware (e.g., fixed logic circuitry), manual processing, or a combination of these implementations. The terms "module," "engine", "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable storage media, e.g., memory. The features of the techniques described below are platform-independent, meaning that the techniques may be implemented on a variety of commercial computing platforms having a variety of processors.

Figure 2:
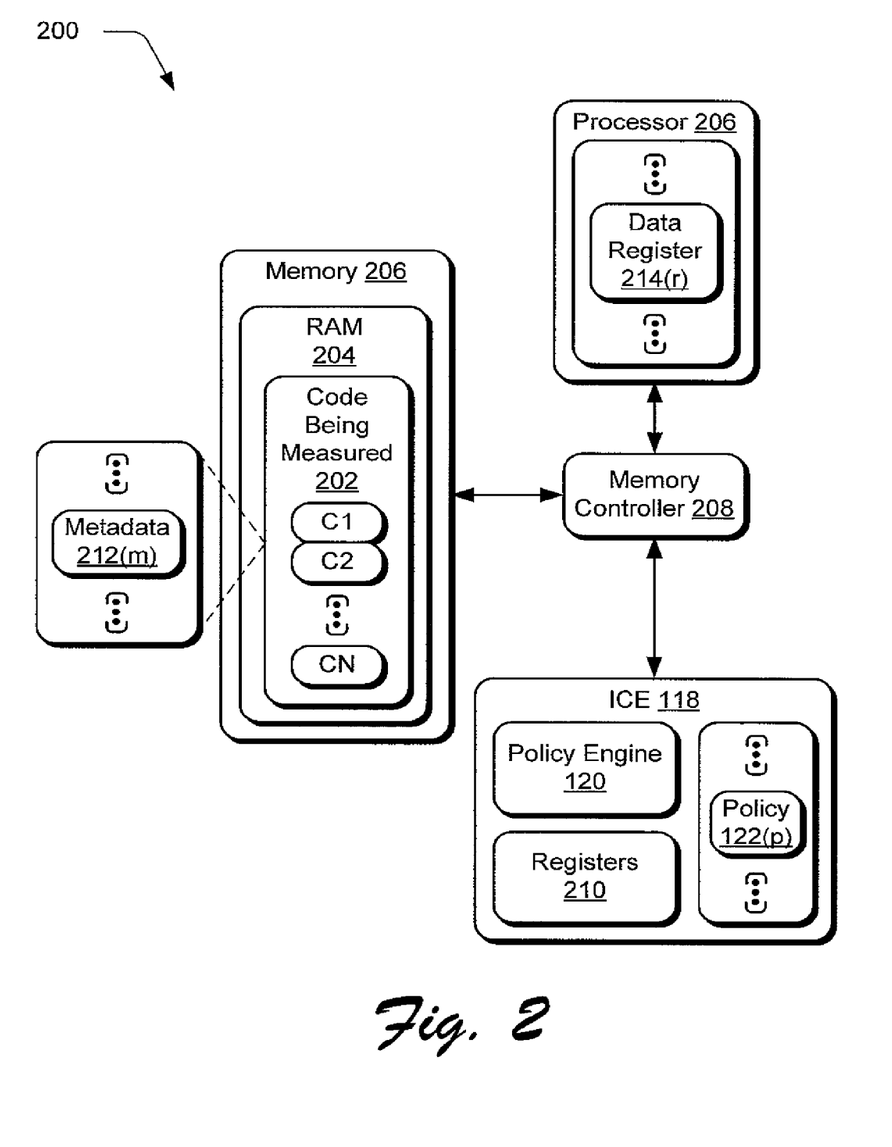
FIG. 2 is an illustration of an architecture including an independent computation environment that measures the health of one or more sets of subject code running in memory.
Figure 3:
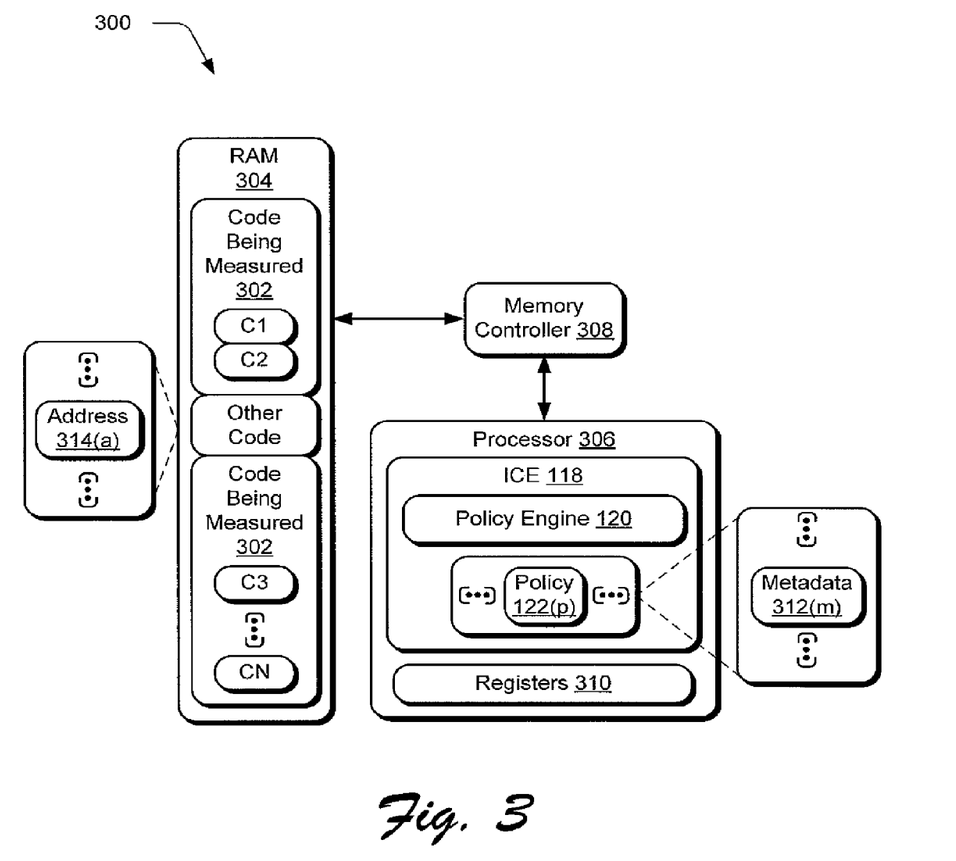
FIG. 3 is an illustration of an architecture including an independent computation environment incorporated in a processor that measures the health of one or more sets of subject code running in memory.

FIGS. 2 and 3 represent examples of an independent (or isolated) computation environment 200 or 300 measuring the health of one or more sets of code 202 or 302 (which may or may not correspond to modules 108(a) of FIG. 1) code modules or the like. The code 202 or 302 is illustrated as including portions "C1-CN", which represent examples of portions of the code running in one or more memory regions in physical memory, which is illustrated as volatile memory configured as RAM 204, 304 but other types are also contemplated.

As should be readily apparent, the one or more sets of code (illustrated as C1-CN) need not be contiguous in the physical memory, as represented in the non-contiguous sets in the RAM 304 represented in FIG. 3. In another implementation, the code is measured in virtual memory, such as by having the virtual memory-related code of the operating system 110 to manipulate virtual-to-physical mapping. In this implementation, virtual-to-physical mapping may be controlled by a trustworthy component, and/or by the ICE 118 described herein to measure the contents and behavior of instructions in the physical memory space.

In the implementation represented in FIG. 2, the ICE 118 is an independent entity (that is, not part of another hardware component such as the processor 206). In the alternative implementation represented in FIG. 3, the ICE 118 is shown as being incorporated into the processor 306, e.g., as part of its circuitry or as independent circuitry in the same physical package. Yet another implementation may rely on software only.

The independent computation environments 118 of FIGS. 2 and 3 each include (or are otherwise associated with) hosted logic (illustrated as policy engines 120), and respective installed policies 122(p), any or all of which may be hard wired at least in part and/or injected later for change (e.g., by being flashed, possibly with an expiration time). Part or all of the policy may be within the policy engine 120 and/or separate from it, e.g., coded into rules. The policy engine 120 and/or policies 122(p) may be signed, or otherwise known to be valid (e.g., via hard wiring), and may be required to be present on a certain computer or class of computer. Further, different policy engines 120 and/or policies 122(p) may apply to different types of computers. As but one example, the policy engine 120 and/or its related policy 122(p) of FIG. 3 of the ICE 118 of FIG. 3 incorporated into the processor 306 may be different from the policy engine 120 and/or its related policy 122(p) of the ICE 118 of FIG. 2.

Although all possible implementations are not shown, it is understood that an independent computation environment may be independent as in FIG. 2, or incorporated into essentially any suitable hardware component, (possibly but not necessarily the processor 306 as in FIG. 3), as long as the independent computation environment is isolated from tampering. Thus, other alternative implementations are feasible. For example, the ICE 118 may be implemented in other hardware, such as in a memory controller, or may be part of special RAM chips, e.g., built into a motherboard. Moreover, while the policy engine 120 and/or policy 222(p) may be considered part of the ICE 118, there is no physical requirement that it be part of the same hardware component or components, and indeed the independent computation environment may be made up of various, physically distinct hardware components.

For purposes of simplicity herein, the following description will use the reference numerals of FIG. 3 unless otherwise noted. As can be readily appreciated, the physical location of the independent computation environment can vary between embodiments, and thus the discussion of the embodiment of FIG. 3 may apply to a variety of other embodiments, including that of FIG. 2, when describing many of the characteristics of an independent computation environment.

Regardless of any physical implementation/embodiment, ICEs 118 may have a number of characteristics that are similar to one another. For example, the ICE 118 of FIG. 3 provides the logic with reliable access to the RAM 304, where the subject set or sets of code 302 being measured (e.g., the module or modules being monitored/validated/authenticated 108(a) of FIG. 1) reside. In an implementation, to access the RAM 304 the policy engine 120 does not depend on an operating system 110 side agent for access, because the operating system could be compromised. The measured code 302 may reside anywhere in RAM 304, as long as the ICE 118 has a way of knowing "where" it is. For example, the ICE 118 may use offsets, and/or may have an instruction pointer to a window (or pointers to windows) in the RAM 304 or other memory. Another, somewhat simpler option is to ensure that the set of code 302 to be measured resides in the same physical address space.

The memory section or sections that contain the measured code sets (e.g., C1-Cn) may be watched by some mechanism, referred to as a memory watch component, or memory watchdog. In general, a memory watchdog fires exceptions/events upon attempts to modify at least one designated location in memory; (note that at least one "location" includes as little as a single location, or any contiguous or non-contiguous range, memory block or set of blocks). This relates to any memory modification, including processor-originated and peripheral-originated RAM write requests. The memory controller 208 or 308 may be configured to provide such events, and thus should also be based on hardware that cannot be easily compromised, however it is understood that a memory watch component/watchdog may comprise software or hardware, or a combination of software and hardware. In an implementation, an event fired from the memory watchdog causes a redo of a code authenticity check, but this redo is limited by an amount of time. In another implementation, execution of the subject code is blocked until it is validated again.

Various techniques for handling memory watchdog exceptions may be used. For example, in one implementation, the processor 306 may be halted during such exceptions until clearance by the policy engine 120 and/or policy 122(p) of the ICE 118. Alternatively, the ICE 118 may instead otherwise penalize the system state (e.g., block the problematic code, reduce the system, reset the system or otherwise activate some enforcement mechanism) upon an attempt to alter modify the RAM in the region of the subject code 302. Another alternative is to have the independent computation environment block write access to the subject code 302.

With respect to the measurements of the subject code 302, the policy engine 120 may use a variety of techniques. For instance, hashes/digital signatures/certificates and/or other mathematically computations may be used to authenticate that a correct set of binary code is present where it should be, such as based on digital signature technology (e.g., according to Cert X.509 and/or Rivest, Shamir & Adelman (RSA) standards) that may be compared to one or more corresponding values in the policy 122(p). Alternatively, if the measured code is relatively small, the policy engine 120 may simply evaluate its instructions, or some subset thereof, against values in the policy that match the instructions. Still another option is statistical or similar analysis of the code, e.g., such as a pattern in which it executes, as described below. Any combination of measuring techniques may be employed.

It should be noted that the computations that may be taken to evaluate the memory may take a significant amount of time to perform. Indeed, the watched range may change while the range of memory is being read, e.g., linearly. Thus, depending on policy, the watchdog may trigger a re-read upon any change during the reading operation so that the memory that was already read cannot be changed behind the location currently being read. The policy may specify that this is allowable, or may specify trying again, and if so, how often (e.g., up to some limit), and so forth.

Thus, the policy engine 120 may obtain data about the health of the subject code 302 in various ways. One way to obtain health data is for the independent computation environment to set soft-ICE-trap instructions in points of interest in the code 302. Alternatively, or in addition to the trap technique, the hardware (e.g., the processor 306) may allow the ICE 118 to ask for statistics about execution of the subject code 302. This may be accomplished by defining registers (210 or 310) or the like that trigger the counting of execution of certain binary instructions or ranges of instructions. Note that if present, these registers 210 or 310 may be in the hardware to avoid tampering, such as exemplified as being part of the independent computation environment 118 of FIG. 2 or in the processor 306 of FIG. 3.

Note that the measured code of interest may have accompanying metadata, which may be schematized as a part of the code being measured as illustrated by metadata 212(m) of FIG. 2 and/or stored as part of the policy 122(p) as illustrated by metadata 312(m) of FIG. 3. The metadata 212(m), 312(m) may describe a variety of information, such as what sort of statistics are to be gathered, a description of how a healthy module should look, where" a healthy module should be executed (e.g., data registers, memory addresses), and so on. The metadata 212(m), 312(m) may be provided by the module author and/or a computing device provider, e.g., manufacturer or seller. For example, metadata 212(m), 312(m) may specify that the ICE 118 should have control of the processor 206, 306 ten-to-fifteen times per second, that the instruction at some address (e.g., A1) in the subject code 302 should be executed ten times for each time the instruction at some other address (e.g., A2) is executed, and so forth.

Further examples of metadata 212(m), 312(m) that may be associated with a set of subject code to describe its health characteristics to the ICE 118 (that is essentially standing guard to validate compliance) include digital signature(s) for integrity and/or authentication checks, and/or expected number of times the module gets to execute per period (e.g., second, minute, or other). This number of execution times may be a range, and may be as general as the entire set of code, and/or more specific to the granularity of instruction ranges or specific instructions. Instead of or in addition to execution statistics, a statistical evaluation of how often the code resides in memory may be evaluated, e.g., a module may have to be loaded into memory some threshold amount (or percentage) of time, and/or only may be not in the memory for a specified amount of time, (or number of times per second, minute and so forth).

Still another example of metadata 212(m), 312(m) and statistics specified therein includes the expected values of certain registers (e.g., the data registers 214(r) of FIG. 2) and/or memory addresses (e.g., the addresses 314(a) of RAM 304 in the computing device of FIG. 3) at certain instructions. This may be pronounced as a distribution, e.g., as various values or ranges of values with a probability weight. Another type of metadata 212(m), 312(m) may specify a relationship between the expected values of several registers and memory addresses; for example, if one variable is less than ten (Var1<10), another variable has to match certain criteria, (e.g., 50 percent of the time variable Var2 is greater than, 25 percent of the time is greater than 100, and sometimes may be 399; Var2 should never be less than zero).

Other examples of metadata 212(m), 312(m) include those based on instructions. Instructions may be counted for the number of times they execute relative to other instructions, optionally with statistics/ratios used for evaluating good counts versus bad counts, so that a small number of occasional differences may be tolerated. When something looks suspicious but is not necessarily a definite violation, the policy may change to run a different algorithm, change variables, watch more closely or more frequently, and so forth.

Yet other examples of metadata 212(m), 312(m) include those which describe where and how data is stored. For example, the metadata 212(m), 312(m) may describe a particular memory addresses (e.g., the addresses 314(a) of FIG. 3), in which, a module is to be stored, particular data registers 214(r) in the processors 206, 306, and so on. In this way, the metadata 212(m), 312(m) may specify a "bubble", in which, execution of the code 202, 302 is permitted by monitoring attempts to interact with the data registers 214(r) and/or addresses 314(a), such as by monitoring control bits, pointers, status bits, and so forth.

Additionally, access to the "bubble" may also be provided in a variety of ways, such as "explicit" in which read access is provided to other modules (e.g., the operating system 110) and "implicit" in which access to the bubble is limited to the policy engine 120 and prevented by other modules (in other words, the bubble and its existence is contained within the bounds of the ICE 118). One or more optional APIs may be provided to facilitate operation, such as Ice.BeginMemoryAddess( ), Ice.EndMemoryAddress( ), Ice.AccessPermitted( ), and/or others. Further discussion of metadata and data storage may be found in relation to FIG. 5.

Using the metadata and/or other techniques, the ICE 118, via the policy engine 120 and policy 122(p), may measure and validate the integrity and authenticity of any specified set of code (e.g., C4). For example, the ICE 118 may be programmed to look for a certain set of one or more modules, or expect a policy that specifies which module or modules are to be validated.

During normal operation, the policy engine 120 may be activated by an operating system request. For example the ICE 118 may (via an internal timer) gives the operating system a grace period to initiate the validation measurement, and if this time elapses, the independent computation environment may deem the system corrupt (unhealthy) and take some penalizing action.

Note that with respect to measurement time, as described above, one option is to specify that a set of subject code to be measured (e.g., C3) is to reside in the same physical address space. In such a situation, the ICE 118 may attempt verification speculatively, including at random or pseudo-random times.

Before starting the measurement process, the policy engine 120 may "lock" some or all of the subject code, also referred to as target modules. One implementation uses the above-described memory-altering watchdog to ensure that the subject code is not changed in the watched region or regions. If the memory watchdog fires, it is an indication that the subject memory/module is altered. In this case the ICE-hosted-policy-engine can take an action aimed at protecting the system integrity or penalizing for diverting from compliance. Another measuring technique may lock the memory for write accesses, although this requires unlocking if and when the operating system attempts to repurpose the RAM (e.g., RAM 204 or 304), e.g., for virtual memory and paging, which may be allowed in a given measured code situation.

To this end, the policy engine 120 may provide the operating system some interface (which may be explicit or possibly implicit) to repurpose the RAM 304. An explicit interface would allow the operating system 110 to notify the ICE 118 about its intent to repurpose the RAM; in general, this may be viewed as the operating system 10 asking the ICE 118 for permission to repurpose the RAM 304. One or more optional APIs may be provided to facilitate operation, such as Ice.AskPermissionToRepurposeMemory( ), Ice.SetValidationPolicy( ), Ice.SuggestModuleAddress( ), Ice.UpdateModuleMetaInfo( ), and/or others.

An implicit interface can be based on the memory-watchdog-exception, which is interpreted by the ICE 118 as a request to permit RAM repurposing. Along these lines, there are times when the ICE 118 does not care how the memory is repurposed, e.g., at times when the code is not being measured. For example, metadata may indicate that a set of code is to be measured ten times per second, and during non-measuring times the operating system can use the memory any way it wants.

Upon a RAM repurposing request, the ICE 118 may implicitly or explicitly grant the request. In any case, the ICE 118 still stands guard to ensure the health of the code being measured, as subject to the metadata associated with that measured code.

By way of example, given an independent computation environment (e.g., hierarchical, system-based or a similar "root of trust"), various features are desirable to enable modular-authentication.

In general, the ICE 118 provides reliable read access to memory of the computing device 104, e.g., volatile memory such as RAM 204, 304. The policy engine 120 assumes that the read operations are neither virtualized, nor they are re-mapped to other memory or I/O space, nor filtered or modified in any other manner; (at present, contemporary BIOS can leverage a subset of this when the hardware follows best practices about the chipset). The ICE 118 also may enable the policy engine 120 to set watchdogs on certain memory areas that will trigger one or more signals upon each modification of the contents of these memory areas. The watchdog provides alerts about any memory contents change in the physical memory space, including changes originated by direct memory accesses (DMAs) and bus master. Note that an existing x86-based computer system may incorporate an ICE into its BIOS by having the BIOS host a policy engine, e.g., one that can measure subject code as long as the subject code remains fixed in a particular memory range.

The ICE 118 may further enable the policy engine 120 to obtain statistics about the instruction pointer's appearance in certain memory ranges. For instance, an instruction pointer-watchdog may be used to alert the ICE 118 every time the instruction pointer gets into and out of specified memory range(s) of interest. Other models are viable, including the register-based model described above.

As also described above, the ICE 118 also may be configured to observe/attest as to the sort of activity of the code being measured. For example, the author can describe (e.g., in metadata) a module's characteristic behavior in virtually any way, as long as the independent computation environment can measure and evaluate the behavior. As long as that module behaves within the specified behavior (e.g., performance) envelope, that module is considered healthy.

By way of example, a relatively straightforward characteristic to profile and follow is input/output (I/O) operation. To this end, the authenticated modules may be fastened in such a way that if stolen (e.g., placed into the image of another operating system), the modules will have to be kept healthy to pass the modular authentication successfully. As a result, if these modules are placed into the code of another operating system, they will have to get control and direct access without virtualization (except in the hardware device itself).

As described above, the ICE 118 may continuously monitor the code being measured 302, but depending on the policy 122(*p*), may instead only monitor the code 302 at times the policy 122(*p*) deems appropriate. As a result, code that need not be monitored continuously may be swapped into memory, such as according to policy, with measurement or statistical gathering only taking place on the code during the time that it is swapped into memory.

Figure 4:
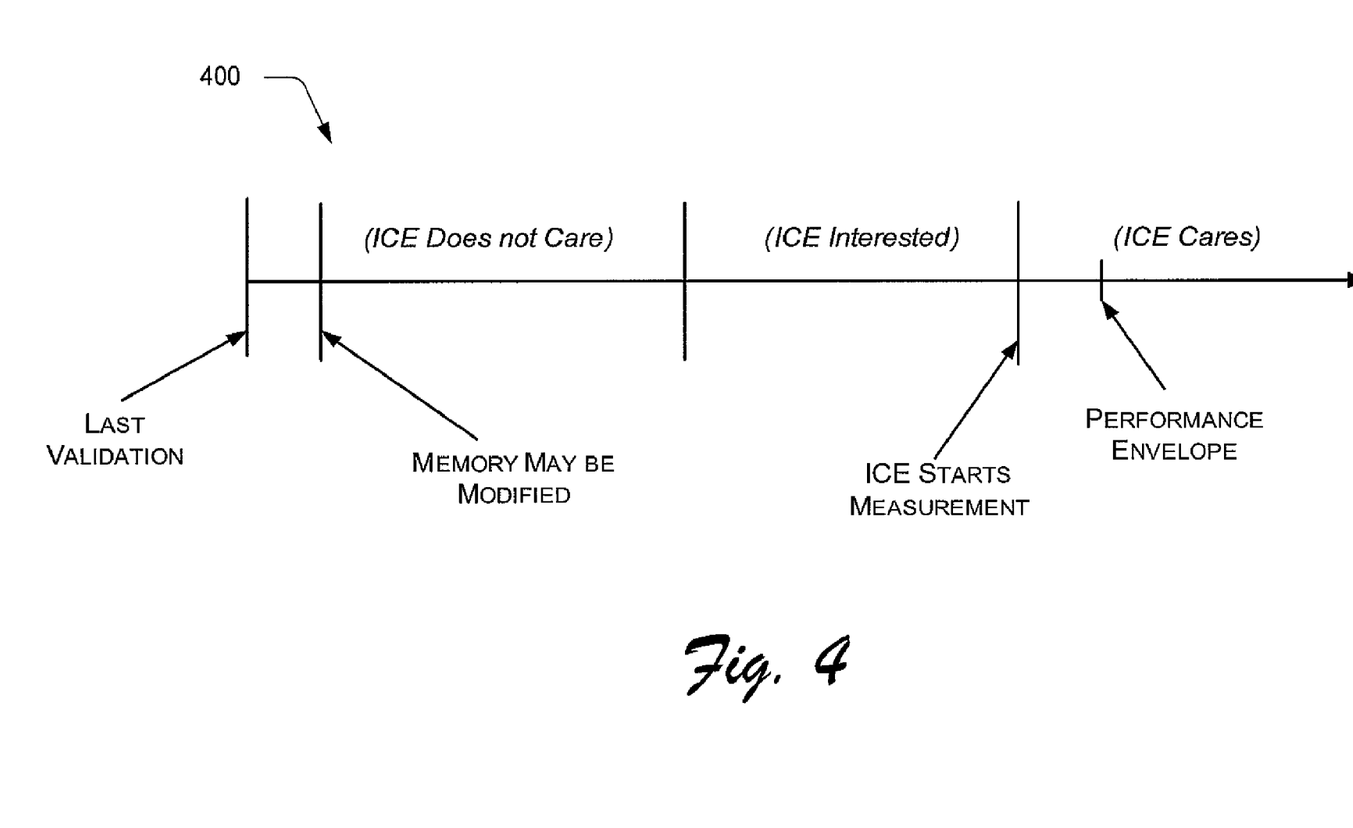
FIG. 4 is an illustration showing an exemplary timing diagram representing various time windows that may exist with respect to measuring the health of subject code.

FIG. 4 shows an example timing diagram in which the ICE 118 occasionally measures (e.g., periodically or on some event, or even randomly) about what code is present and/or how it is operating. Note that FIG. 4 is a timing diagram for what is in the memory; with a statistical-based analysis, e.g., how many times certain instructions of the code are executed relative to other instructions, or with a frequency-based analysis, e.g., how many times certain instructions of the code are executed per time period, the "ICE does not care" region can essentially span the entire time, as long as the counts (e.g., in the registers) are correct whenever measured, which may be fixed or sporadic.

The policy 122(*p*) will typically decide on when and what kind of measuring is needed. For example, the timing diagram exemplified in FIG. 4 does not require that the code being measured remain in memory at all times. Thus, there is an "ICE does not care" time frame that follows (except for the first time) a previous measurement complete state, referred to in FIG. 4 as "Last Validation." In this time frame, the operating system can swap in new code or otherwise leave whatever it wants in the corresponding measured region or regions, because they are not being measured at that time. If locked, the memory region may be unlocked at this time.

In the "ICE interested" time, the ICE 118 may start its measurement, such as to reset counters and the like, although if not correct in this time frame, no enforcement may be done. This time frame may also correspond to the above-described grace period in which the operating system is given time to complete something, as long as it triggers the independent computation environment's measurement before the grace period expires. In this manner, the ICE 118 may or may not operate, but no penalty will be assessed unless and until some violation is later detected.

When the independent computation environment does measure, in the "ICE Cares" time frame, the measurement needs to be started and correct at the time that is shown as "Performance Envelope" is reached, or some type enforcement will be activated. Again, the policy determines the timing, the type of measurement, the type of enforcement and so forth.

In general, when the validation fails, or some or all of the describing policy (e.g., comprising any data used by the policy engine 120) is absent, the ICE 118 penalizes the computer system by changing its state in some way, as generally described above. For example, when the code that is in memory is not the correct set of code and/or is not behaving correctly at the measuring time, the enforcement mechanism is activated, e.g., to halt the system. Other examples include locking the computer system, slowing down the computer system, limiting memory in some way, slowing I/O, affecting (e.g., killing) a relevant process via trap instructions, overwriting process code (e.g., with infinite loop instructions), and so forth. The independent computation environment may alert the overlaying operating system prior to taking any penalizing acts.

It should be noted that numerous combinations of timing, the types of measurement, the types of enforcement and so forth may vary between classes of computers, or even in the same computer system itself. For example, in the same computer, one code module being evaluated may have to physically reside in the same location in memory at all times, another module may be swapped in and out but have to be present at measuring time, yet another module may be swappable at any time but have to periodically meet performance requirements (meaning it has to be executed often enough to do so), and so forth.

It should be noted that the enforcement that is taken may vary when a violation is detected, and different types of violations may result in different types of enforcement. For example, changing one (e.g., highly critical) code module may result in the system being shut down by the ICE, whereas changing another may result in the operating system being notified so as to present a warning to the user or send a message to the computer system manufacturer, program vendor or the like (e.g., some licensing entity). As another example, as described above, missing a statistic may not result in an immediate penalty, but instead will result in more careful watching, at least for awhile, to determine if further enforcement should be taken.

Exemplary Procedures

The following discussion describes secure execution environment techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environments of FIGS. 1-3.

Figure 5:
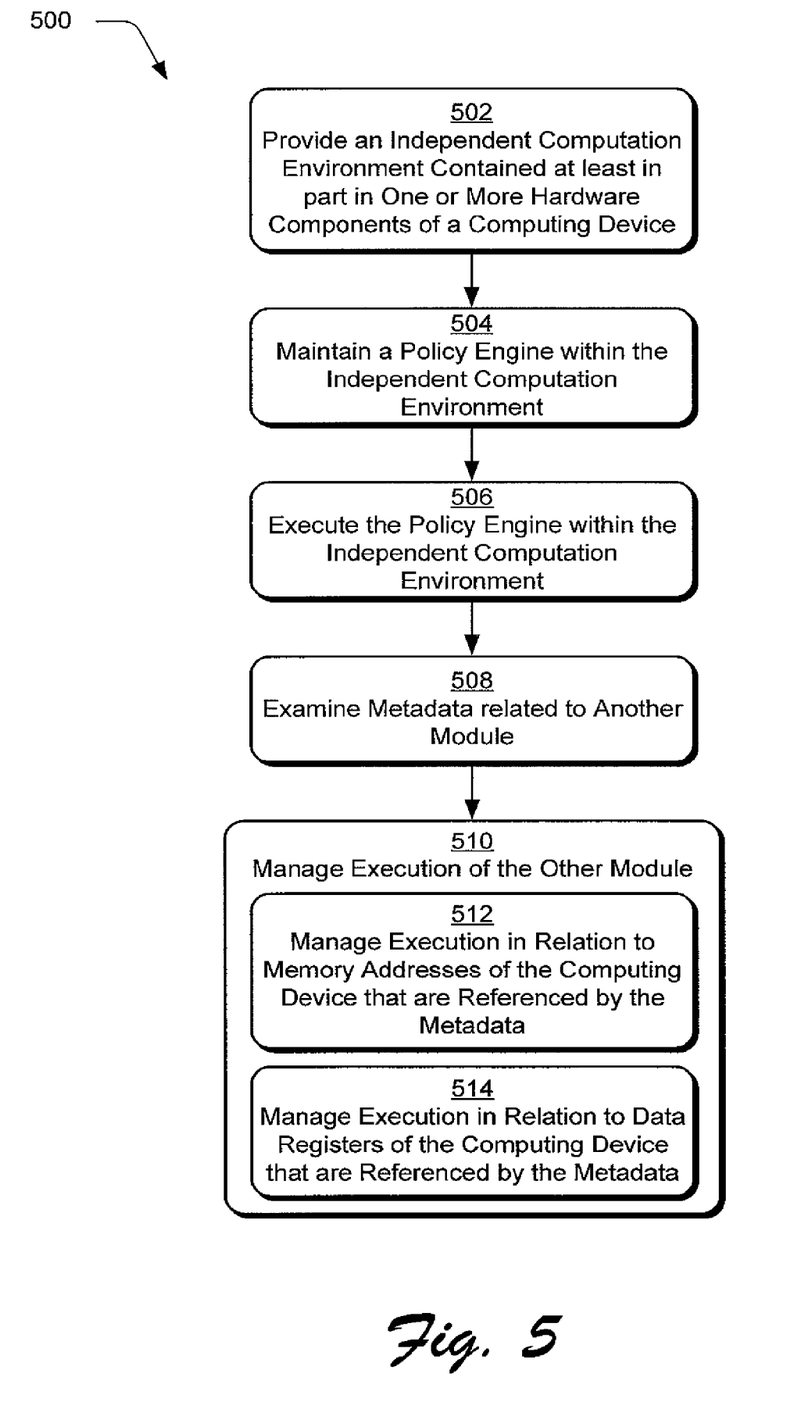
FIG. 5 is a flow diagram depicting a procedure in an exemplary implementation in which execution of a module is managed by a policy engine based on metadata that describes memory addresses and data registers that are to be used during execution.

FIG. 5 depicts a procedure 500 in an exemplary implementation in which execution of a module is managed by a policy engine based on metadata that describes memory addresses and data registers that are to be used during execution. An independent computation environment is provided which is contained at least in part in one or more hardware components of a computing device (block 502). For example, the ICE 118 may be provided via dedicated hardware components separate from the processor 206 as illustrated in FIG. 2, may be provided "within" the processor 206 as illustrated in FIG. 3, and so on.

A policy engine is maintained within the independent computation environment (block 504) and executed within the independent computation environment (block 506), such as previously described in relation to FIGS. 1-4. Although described as an executable, it should be apparent that the policy engine may be "fused together" with the independent computation environment, may be implemented via microcode, and so on.

When executed, the policy engine examines metadata related to another module (block 508). The other module may be configured in a variety of ways. For example, the other module may be configured as an operating system 110 that provides a basis for execution of other modules 108(*a*). The other module 108(a), for instance, may be configured as a productivity application, game, configured for network access, configured to add functionality to other modules (e.g., through configuration as a "plug in" module), configured as a part of a collection of modules that form another module as shown in FIGS. 2 and 3, and so on.

The metadata that is examined may also be configured in a variety of ways. For instance, the metadata may be stored as part of the module being examined. In another instance, the metadata may be stored as a part of a policy elsewhere on the computing device, obtained from over a network connection, and so on.

Execution of the other module is then managed (block 510) according to the metadata. For example, the execution may be managed in relation to memory addresses of the computing device that are referenced by the metadata (block 512). The memory addresses, for instance, may specify physical or virtual memory addresses of nonvolatile memory (e.g., RAM) of the computing device, from which, execution of the module is to be performed. In this way, the policy engine may create a "bubble" that is accessible by the module. Access to the "bubble" may also be provided in a variety of ways, such as "explicit" in which read access is provided to other modules (e.g., the operating system 110) and "implicit" in which access to the bubble is limited to the policy engine 120 and prevented by other modules (in other words, the bubble and its existence is contained within the bounds of the ICE 118).

In another example, execution is managed in relation to data registers of the computing device that are referenced by the metadata (block 514). Like before, the metadata may describe particular registers, in which, execution of the module is to be performed and then manage access to those registers in an explicit or implicit fashion. It should be noted that the memory addresses and the data registers may be managed using different techniques, such as to manage the data registers in an implicit fashion and manage memory addresses in an explicit fashion. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    implementing an independent computation environment contained at least in part in one or more hardware components of a computing device; and
    implementing a policy engine within the independent computation environment, the policy engine comprising a communication interface and the policy engine executable to:
        authenticate code of an executable module based on examining metadata of the executable module, the metadata specifying statistics that indicate authenticity of the executable module, and the statistics are related to counting execution of binary instructions during execution of the executable module,
        according to an execution policy, to manage the execution of the executable module in relation to one or more memory addresses of the computing device that are referenced by the metadata of the executable module, and the policy engine manages the execution of the executable module in relation to the one or more memory addresses by communicating via the communication interface, according to the execution policy, to allow access to the one or more memory addresses and to prevent access to the one or more memory addresses, and the execution policy specifying that code of the executable module is absent from the one or more memory addresses of the computing device that are referenced by the metadata during a first time period and that the policy engine measures the statistics related to the execution of the executable module during a second time period;
    store data related to the execution of the executable module in the one or more memory addresses referenced by the metadata during the execution of the executable module and avoid storing the data related to the execution of the executable module in another memory address not specified by the metadata; and
    manage the execution of the executable module by monitoring status bits of the executable module that are stored in one or more data registers referenced by the metadata.

2. The method as described in claim 1, wherein the one or more memory addresses are physical memory addresses of volatile memory of the computing device.

3. The method as described in claim 1, wherein the one or more memory addresses are virtual memory addresses.

4. The method as described in claim 1, wherein the metadata is included in the execution policy that is accessible by the policy engine within the independent computation environment.

5. The method as described in claim 1, wherein the metadata is included in the executable module.

6. The method as described in claim 1, wherein
    the policy engine uses the independent computation environment to monitor the execution of the executable module in relation to the one or more data registers.

7. The method as described in claim 1, wherein the policy engine and the independent computation environment manage the execution of the executable module by monitoring pointers that point to the one or more memory addresses.

8. The method of claim 1, wherein the metadata of the executable module specifies a relationship between expected values of the one or more memory addresses of the computing device that are referenced by the metadata of the executable module.

9. One or more processor-accessible storage media comprising processor-executable instructions that, when executed:
    direct a computing device to execute a policy module in an independent computation environment, contained at least in part in a set of one or more hardware components of the computing device, and the policy module executable to:
        authenticate code of another executable module based on examining metadata of the other executable module, the metadata specifying statistics that indicate authenticity of the other executable module, and the statistics are related to counting execution of binary instructions during execution of the other executable module;
        manage the execution of the other executable module in relation to one or more memory addresses of the computing device that are referenced by the metadata of the other executable module, and the policy module manages the execution of the other executable module in relation to the one or more memory addresses by communicating via a communication interface, according to an execution policy, to allow access to the one or more memory addresses and to prevent access to the one or memory addresses, and the execution policy specifying that code of the other executable module is absent from the one or more memory addresses of the computing device that are referenced by the metadata during a first time period and that the policy module measures the statistics related to the execution of the other executable module during a second time period;

store data related to the execution of the other executable module in the one or more memory addresses referenced by the metadata during the execution of the other executable module and avoid storing the data related to the execution of the other executable module in another memory address not specified by the metadata; and manage the execution of the other executable module by monitoring status bits of the other executable module that are stored in one or more data registers referenced by the metadata.

10. The one or more processor-accessible storage media as described in claim 9, wherein the one or more data registers are included in a processor of the computing device.

11. The one or more processor-accessible storage media as described in claim 9, wherein the one or more memory addresses are physical memory addresses of volatile memory of the computing device.

12. The one or more processor-accessible storage media as described in claim 9, wherein the one or more memory addresses are virtual memory addresses.

13. A computing device comprising:

a processor having a plurality of data registers;

memory having a plurality of memory addresses; and the memory configured to maintain:

a policy engine within an independent computation environment, the policy engine comprising a communication interface and the policy engine executable to:

authenticate code of an executable module based on examining metadata of the executable module, the metadata specifying statistics that indicate authenticity of the executable module, and the statistics are related to counting execution of binary instructions during execution of the executable module, according to an execution policy, manage the execution of the executable module in relation to one or more memory addresses of the computing device that are referenced by the metadata of the executable module, and the policy engine manages the execution of the executable module in relation to the one or more memory addresses by communicating via a communication interface, according to an execution policy, to allow access to the one or more memory addresses and to prevent access to the one or more memory addresses, and the execution policy specifying that code of the executable module is absent from the one or more memory addresses of the computing device that are referenced by the metadata during a first time period and that the policy engine measures the statistics related to the execution of the executable module during a second time period;

store data related to the execution of the executable module in the one or more memory addresses referenced by the metadata during the execution of the executable module and avoid storing the data related to the execution of the executable module in another memory address not specified by the metadata; and manage the execution of the executable module by monitoring status bits of the executable module that are stored in one or more data registers referenced by the metadata.

14. The computing device as described in claim 13, wherein the policy engine is configured to specify the one or more said data registers and one or more memory addresses dynamically based on information contained within the policy.

15. The computing device as described in claim 13, wherein the policy engine is configured to enforce the policy by preventing access to the one or more data registers or the one or more memory addresses by an additional module.

16. The computing device as described in claim 15, wherein the additional module is an operating system.

17. The computing device as described in claim 13, wherein the policy engine is configured to enforce the policy by allowing access to the one or more data registers or the one or more memory addresses by an additional module.

* * * * *